(12) United States Patent
Abene et al.

(10) Patent No.: US 6,669,975 B1
(45) Date of Patent: Dec. 30, 2003

(54) CUSTOMIZED DIETARY HEALTH MAINTENANCE SYSTEM FOR PETS

(75) Inventors: Thomas G. Abene, Los Alamitos, CA (US); Michael J. Wilson, Rossmoor, CA (US); Stefano E. Zancan, Auckland (NZ)

(73) Assignee: Mars Incorporated, McLean, VA (US)

( * ) Notice: Subject to any disclaimer, the term of this patent is extended or adjusted under 35 U.S.C. 154(b) by 0 days.

(21) Appl. No.: 09/498,240

(22) Filed: Feb. 3, 2000

(51) Int. Cl.⁷ ................................................ A23K 1/00
(52) U.S. Cl. ........................ 426/302; 426/2; 426/232; 426/805; 426/635
(58) Field of Search ........................... 426/232, 2, 302, 426/805, 635

(56) References Cited

U.S. PATENT DOCUMENTS

| | | | |
|---|---|---|---|
| 3,705,695 A | 12/1972 | Sandor | 241/34 |
| 4,022,915 A | 5/1977 | Zukerman | 426/72 |
| 4,087,556 A | 5/1978 | Harte | 426/2 |
| 4,712,511 A | 12/1987 | Zamzow et al. | 119/51 R |
| 5,299,529 A | 4/1994 | Ramirez | 119/51.1 |
| 5,355,833 A | 10/1994 | Legrain | 119/51.02 |
| 5,552,176 A | 9/1996 | Marino | 426/641 |
| 5,851,573 A * | 12/1998 | Lepine et al. | 426/74 |
| 5,968,569 A * | 10/1999 | Cavadini et al. | 426/61 |
| 6,156,355 A * | 12/2000 | Shields, Jr. et al. | 426/74 |
| 6,254,920 B1 * | 7/2001 | Brunner | 426/656 |
| 6,358,546 B1 | 3/2002 | Bebiak et al. | 426/232 |
| 2001/0043983 A1 * | 11/2001 | Hamilton | 426/635 |

OTHER PUBLICATIONS

'Royal Canin RCCI Size', internet pages from http://www-.labrador.cz/royalpes.htm., pp. 1–4, 1997.*

* cited by examiner

*Primary Examiner*—Chhaya Sayala
(74) *Attorney, Agent, or Firm*—Fulbright & Jaworski L.L.P.

(57) ABSTRACT

The subject invention is directed to a customized dietary health management system for pets. The pet food diet provides the required level of nutrients and it includes a customized pet food product formulated from a dry pet food kibble recipe and selected functional additives. The formulation of the dry pet food kibble is selected on the basis of an individual pet's attributes and physical conditions. The diet further includes a selected wet pet food, functional snacks and treats, and health accessories packaged with specific feeding instructions for the pet. The dietary health management system raises the level of nutrients for a companion animal from an adequate level to an optimal level, thereby enhancing the health and happiness of the companion animal.

10 Claims, 2 Drawing Sheets

PERFECT FIT By WALTHAM

Special Blend for:
Tessa

This PERFECT FIT by WALTHAM dry diet was developed for Tessa with information that was provided by her veterinarian, Dr. Jones. This dry product is a medium protein recipe made with real chicken as the first ingredient. Highly digestible carbohydrates are used and the product has a special blend of fibers for digestive health. This product is also fortified with essential fatty acids, vitamins and minerals to ensure Tessa keeps her healthy skin and coat. To help with Tessa's joint problems, this product is fortified with glucosamine and condroitant sulfates in conjunction with gamma linoleic acid (GLA).

We have also delivered 2 cases of WALTHAM Adult canned food for dogs products and WALTHAM Tartar Chew. Our Tartar Chew is clinically proved to reduce tartar and plaque build up.

If you have any questions regarding our food or feeding instructions please contact us immediately.

Product Custom Made 15 January 2000          Best Used By 15 April 2000

| Guaranteed Analysis | | Ingredients: |
|---|---|---|
| Crude Protein | 25% min. | Chicken, Chicken Meal, Canola Meal, Rice, Barley, Oats, |
| Crude Fat | 12% min. | Tallow (preserved with mixed tocopherls), Chicken Digest, |
| Crude Fiber | 6% max. | Tomato & Grape Meals, Flax Seed Meal, Sunflower Oil, |
| Moisture | 10% max. | Flax Seed Oil, Borage Oil, Fish Oil, Seatone, Vitamins & |
| Kcal/ 100grams | 310 | Minerals. |
| Days of Supply* | 34 | This product has been formulated to meet AAFCO |
| Cups per Pound | 8 | Nutritional guidelines for a dog of any lifestage. |

*Based on mixed feeding regiment

Feeding Guidelines

These guidelines assume that Tessa's weight of 50 lbs. is to be maintained. Remember these are only guidelines and adjustment may be necessary.

We recommend feeding twice a day. This will help Tessa absorb more of the nutrients and place less stress on her digestive system.

| FOOD | Dry Food Only | Once per Day | Twice per Day Per serving |
|---|---|---|---|
| Custom Diet Dry | 4 1/2 cups | 4 cups | 2 cups |
| Can Large | | 1 can | 1/2 can |
| Tartar Chew | | 1 serving | 1 serving in evening |
| Net Weight 35 lbs. | | Customer # 8875 | Dry Food for Dogs |

*FIG. 1*

CUSTOMIZED DIETARY HEALTH MAINTENANCE SYSTEM FOR PETS

FIELD OF THE INVENTION

This invention generally relates to a customized dietary health management system for pets and more particularly to a customized pet food diet selected on the basis of a pet's attributes and nutritional needs, wherein the diet includes a customized dry pet food kibble and selected wet pet food, functional snacks and treats, and health accessories packaged with specific feeding instructions for the pet.

BACKGROUND OF THE INVENTION

People have become increasingly aware of the importance of a proper diet for the health maintenance and disease prevention of their pets. Customized diets for various life stages and conditions have long been available for humans, but have not been available for companion animals as almost all pet food is a mass produced, off the shelf product.

There are a variety of commonly known pet food products available to pet owners. The selection of cat and dog food includes, as an example, wet pet foods, semi-moist pet foods, dry pet foods and pet treats. Wet pet food generally has a moisture content above 65%. Semi-moist pet food typically has a moisture content between 20–65% and can include humectants such as propylene, glycol, potassium sorbate, and other ingredients to prevent microbial growth (bacteria and mold). Dry pet food (kibble) generally has a moisture content below 20% and its processing typically includes extruding, drying and/or baking in heat. Pet treats can typically be semi-moist, chewable treats; dry treats in any number of forms; chewable bones or baked, extruded or stamped treats; confection treats or other kinds of treats as is known to one skilled in the art. Pet health accessories can include flea collars, tooth brushes, shampoos, DENTA-BONE® or other kinds of pet health accessories as is know to one skilled in the art.

As an example, the ingredients of a dry pet food generally include cereal, grains, meats, poultry, fats, vitamins, and minerals. The ingredients are mixed and put through an extruder/cooker. Thereafter, the product is cutter-shaped and dried. After drying, flavors, and fats can be coated or sprayed onto the dry product.

All pet food is required to provide a certain level of nutrients. As an example, nutrient profiles for both dog and cat foods, based on commonly-used ingredients, have been established by the Association of American Feed Control Officials (AAFCO) and the Pet Food Institute. These established profiles are called the "AAFCO dog food nutrient profiles" and the "AAFCO cat food nutrient profiles." AAFCO has established these profiles and regulations in order to assure that pet food is nutritionally adequate. Under these regulations, dog and cat foods for designated life stage(s) must be formulated to contain concentrations of nutrients that meet all minimum levels and not to exceed the maximum levels as determined by AAFCO. These profiles are designed to establish practical minimum and maximum nutrient levels for dog and cat foods, formulated from non-purified, complex ingredients.

AAFCO has established minimum and some maximum levels for two categories of pet food: growth and reproduction (gestation/lactation), and maintenance. As an example, Table 1 below illustrates the nutrient profiles for dog foods as determined by AAFCO. The nutrient levels are expressed on a dry matter basis at a defined caloric density, which for dogs is 3.5 kcal ME/g dry matter.

TABLE 1

AAFCO DOG FOOD NUTRIENT PROFILES

| Nutrient | Units DM Basis | Growth & Repro Minimum | Adult Maint Minimum | Maximum |
|---|---|---|---|---|
| Protein | % | 22.0 | 18.0 | |
| Arginine | % | 0.62 | 0.51 | |
| Histidine | % | 0.22 | 0.18 | |
| Isoleucine | % | 0.45 | 0.37 | |
| Leucine | % | 0.72 | 0 | 59 |
| Protein | % | 22.0 | 18.0 | |
| Lysine | % | 0.77 | 0.63 | |
| Methionine-cystine | % | 0.53 | 0.43 | |
| Phenylalanine-tyrosine | % | 0.89 | 0.73 | |
| Threonine | % | 0.58 | 0.48 | |
| Tryptophan | % | 0.20 | 0.16 | |
| Valine | % | 0.48 | 0.39 | |
| Fat | % | 8.0 | 5.0 | |
| Linoleic acid | % | 1.0 | 1.0 | |
| Minerals | | | | |
| Calcium | % | 1.0 | 0.6 | 2.5 |
| Phosphorus | % | 0.8 | 0.5 | 1.6 |
| Ca:P ratio | % | 1:1 | 1:1 | |
| Potassium | % | 0.6 | 0.6 | |
| Sodium | % | 0.3 | 0.06 | |
| Chloride | % | 0.45 | 0.09 | |
| Magnesium | % | 0.04 | 0.04 | 0.3 |
| Iron | mg/kg | 80 | 80 | 3000 |
| Copper | mg/kg | 7.3 | 7.3 | 250 |
| Zinc | mg/kg | 120 | 120 | 1000 |
| Iodine | mg/kg | 1.5 | 1.5 | 50 |
| Selenium | mg/kg | 0.11 | 0.11 | 2 |
| Vitamins & Others | | | | |
| Vitamin A | IU/kg | 5000 | 5000 | 250000 |
| Vitamin D | IU/kg | 500 | 500 | 5000 |
| Vitamin E | IU/kg | 50 | 50 | 1000 |
| Thiamine | mg/kg | 1.0 | 1.0 | |
| Riboflavin | mg/kg | 1.0 | 1.0 | |
| Pantothenic Acid | mg/kg | 10 | 10 | |
| Niacin | mg/kg | 11.4 | 11.4 | |
| Pyridoxine | mg/kg | 1.0 | 1.0 | |
| Folic Acid | mg/kg | 0.18 | 0.18 | |
| Vitamin $B_{12}$ | mg/kg | 0.022 | 0.022 | |
| Choline | mg/kg | 1200 | 1200 | |

The AAFCO nutritional guideline provides adequate nutrition but may not provide the animal with optimal nutrition. In addition to providing a nutritionally proper diet for the health maintenance of pets, it is also important to provide companion animals with a diet that includes disease prevention benefits. The effects of certain dietary additives for disease prevention such as joint health, gut health, and skin and coat health has been extensively reported in the literature. Certain of these dietary additives are selectively available in individual off-the-shelf pet food products in the form of supplements or other nutrition enhancers. Pet food products are also available for certain life stages of animals, such as puppies, gestation/lactation, and senior pets. However, there remains a need in the art for customized diets and customized dietary health management systems for pets that are selected on the basis of a pet's attributes and nutritional needs. There is also a need in the art for a customized dietary health management system that includes a customized dry kibble product and selected wet pet food, functional snacks and treats, and health accessories necessary to balance out the nutritional needs, all packaged with specific feeding instructions for the pet.

SUMMARY OF THE INVENTION

The subject invention is directed to a customized dietary health management system for pets. The pet food diet provides the required level of nutrients and it includes a customized pet food product formulated from a dry pet food kibble recipe and selected functional additives. The formulation of the dry pet food kibble is selected on the basis of an individual pet's attributes and physical conditions as determined by the pet's owner, veterinarian or other animal specialist. The diet further includes a selected wet pet food, functional snacks and treats, and health accessories packaged with specific feeding instructions for the pet. The subject invention is also directed to a method of manufacturing a customized dry pet food product that includes the steps of: selecting at least one formulation of pre-made dry kibble; separating a predetermined volume of the at least one formulation of the pre-made dry kibble; blending the predetermined volume of dry kibble; coating the volume of dry kibble with a selected mixture of functional ingredients; and packaging and labeling the predetermined volume of coated dry kibble. The selection of the at least one formulation of the pre-made dry kibble and the mixture of functional ingredients is based on an individual pet's attributes and physical conditions in order to provide a customized dry pet food product.

BRIEF DESCRIPTION OF THE DRAWINGS

The invention will become more apparent when the detailed description of exemplary embodiments is considered in conjunction with the appended drawings, in which:

FIG. 1 is an illustration of a product label with feeding instructions for the dietary health management system.

DETAILED DESCRIPTION OF THE PREFERRED EMBODIMENT

Figure 2:
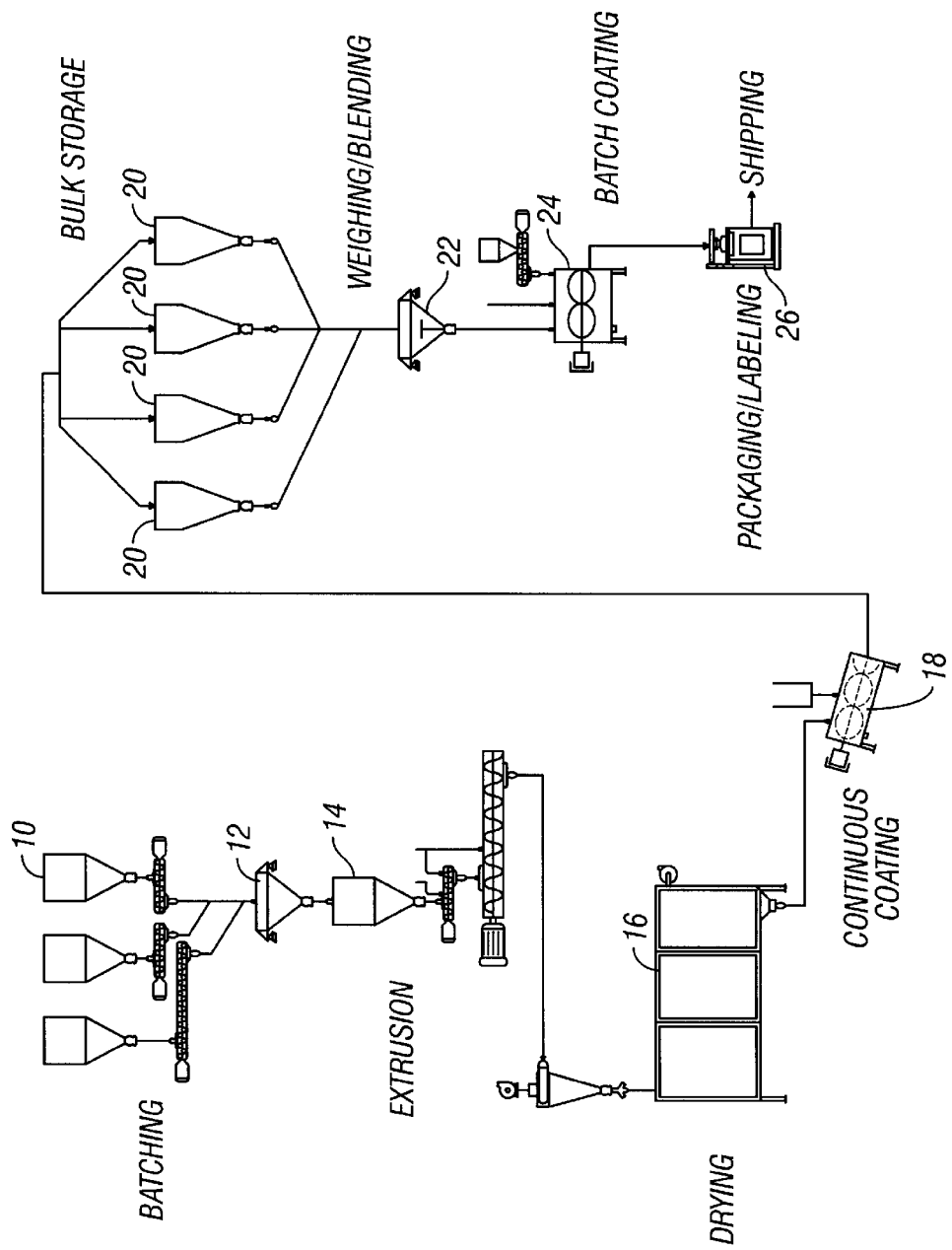
FIG. 2 is a flow diagram of a precess for manufacturing and blending the customized dry pet food product of the subject invention.

The subject invention provides a customized dietary health management system for pets that includes a method of providing a unique dry food product coupled with wet food, functional snacks and treats, and health accessories that are selected on the basis of the nutritional needs of the companion animal. The customized dietary health management system is formulated from information, provided by the owner of the pet, the pet's veterinarian or animal health care provider that relates to certain attributes and physical conditions of the pet. This information is collected on a pet profile form completed by the pet owner or veterinarian. The information from the pet profile is then analyzed and a customized diet and health management system is formulated. The dietary health management system customizes the essential and nonessential nutrients for a companion animal from an adequate level, based on the needs of the average companion animal, to an individual diet designed to optimize the health of a specific companion animal. The individual diet is based on that animal's life stage, activity level and other health related imputs. An example of the kind of information requested on a pet profile is illustrated below in Table 2.

TABLE 2

| Size of dog when fully grown Check one box in puppy | 2–15 lb. | 15–25 lb. | 25–50 lb. | 50–75 lb. | 75–100 lb. | 100+ |
|---|---|---|---|---|---|---|
| Date of Birth | | | | | | |
| Sex | Male | Female | | Comments | | |
| Fixed | Yes | No | | | | |
| Nursing | Yes | No | | | | |
| Pregnant | Yes | No | | | | |
| Coat Type | Short | Long | | | | |
| Itchy/Scratchy Skin | Normal | Excessive | | | | |
| Pet Sleeps/ Lives | Indoors | Outdoors | | | | |
| Weight lb. Current | 2–15 lb. | 15 to 25 lb. | 25 to 50 lb. | 75 to 100 lb. | | 100+ |
| Activity Level | Sporting | Active | Moderate | Sedentary | | |
| Feeding Preference | Meat | Dry | Snacks | Table Scraps | | All |
| Time of Feeding | Morning | Afternoon | Night | | | |
| Known Food Allergies | | | | | | |
| General Condition | Healthy | Average | Needs Improving | | Comments | |
| Teeth | | | | | | |
| Gums | | | | | | |
| Breath | | | | | | |
| Joint Health | | | | | | |
| Weight | | | | | | |
| GI Track | | | | | | |
| Urinary Health | | | | | | |
| Skin & Coat | | | | | | |
| Stool Quality | | | | | | |
| Additional Facts Regarding Pets Health or Nutritional Needs | | | | | | |

The customized diet and dietary health management system is adjusted for the parameters listed above, such as a dog's size, age and sex, which will control the amount of protein and caloric needs of the companion animal. The diet can be customized to provide health benefits for weight loss, joint health, digestive health, skin and coat health, wound healing, puppy health, senior pet health, immune system enhancement, life enhancement and other animal related issues. For example, the diets can be fortified with essential fatty acids, vitamins and minerals to ensure a healthy skin and coat. Anti-oxidant compounds may be added to raise the level of anti-oxidants in the companion animal's blood and fructooligosaccharides, which help good bacteria in the digestive tract, may be added to help improve nutrient absorption for good digestive health.

Mixtures of selected functional ingredients, or functional cocktails, can be added to the dry kibble pet food in order to provide a number of different health benefits. By example only, a functional cocktail for weight loss can include flaxseed oil, corrugated linoleic acid and chicory; a functional cocktail for skin and coat health can include sunflower oil, flaxseed oil, and vitamin E; a functional cocktail for Joint health can include borage oil, flaxseed oil and green lip mussel extract; a functional cocktail for digestive health can include flaxseed oil, vitamin E, fluctooligosaccharide and chicory; a functional cocktail for puppies can include flaxseed oil, sunflower oil, chicory and flaxseed and fish oil, and a functional cocktail for a senior diet can include flaxseed oil, vitamin E, sunflower oil, natural flavor, fructooligosaccharides and chicory. Other ingredients can include vitamin C, SAMME, Gamma linoenic acid, evening primrose oil, soy isoflavones, creatine, herbs, fructo oligosaccharides, mannan oligosaccharides, polyphenols, caroteniods and other supplements.

Again by example only, if a diet is to be customized for puppies, the recipe can be calculated to be caloric dense with the proper nutritional requirements necessary to support the needs of a growing puppy. Alternatively, if a companion animal is nursing or pregnant, the customized diet would be formulated to be caloric dense with the proper nutritional requirements necessary to support either the development of the unborn pups or the nursing needs of the nursing dog and her pups. If the joint health of the pet needs improvement and the companion animal is not a senior dog, the customized diet could be fortified with glucosamine and chondroitin sulfate in conjunction with gamma linoleic acid or other joint support supplements to help support joint function, with the addition of supplemental treats and chews. If a companion animal has itchy and scratchy or flaky skin a wet pet food with a fatty acid supplement may be recommended as part of the diet and caloric intake. If a companion animal's oral condition needs improvement or if the feeding format includes meaty treats, a treat such as a TARTER CHEW® would be recommended as part of the diet and caloric intake. Alternatively, if the feeding format of the companion animal includes biscuits or table scraps, a NUTRIBISCUIT® would be recommended as part of the diet and caloric intake.

The appropriate formulation for the customized dry kibble product and the additional pet food products necessary for a complete dietary health management system can be determined manually from the pet profile. Alternatively, the information from the pet profile can be input into a software program that will convert the information into an appropriate formulation for the customized dry kibble and will determine the proper wet food, functional snacks and treats and health accessories necessary to balance out the nutritional needs of the animal for a complete dietary health management system. The software program can also provide detailed feeding instructions as well as provide the labeling for the customized dry kibble product.

As an example, the software system could be a WINDOW based software system that accepts manual input about the general health conditions of an animal and converts this input into a recipe, a finished goods label and detailed feeding instructions. The system can run on a standard desk-top computer and is capable of performing basic mathematical algorithms. Input information can include the base kibble recipes, the different functional cocktails and the pet profile. The output for each custom product includes the blending ratios, the product label and feeding instructions. An example of a product label with feeding instructions is illustrated in FIG. 1 and an example of a Blending Ratio is illustrated below:

| ITEM | DETAIL | Check When Added |
|---|---|---|
| Customer Name: | Sam Brown | |
| Customer # | KKVP9W1999 | |
| Base Kibble 1 | 22.5 lb | |
| Base Kibble 2 | 15.0 lb | |
| Mix together: | | |
| Cocktail A - Joint Health | 0.3 lb | |
| Cocktail B | | |
| Cocktail C - Skin & Coat | 0.1 lb | |
| Cocktail D | | |
| Cocktail E - Digestive Health | 0.1 lb | |
| Cocktail F | | |
| TOTAL | 38.0 lb | |

The customized dry kibble product is manufactured by blending pre-made dry kibbles, adding additional functional ingredients and then packaging, labeling the finished product and sending the complete dietary health management system to the customer. The various base pet food kibble utilized in the customized kibble product is manufactured according to manufacturing processes known to one skilled in the art. An example of the kind of ingredients found in two different base dry kibble formulations, one for growth and the other for reduced energy, is illustrated below in Table 3.

TABLE 3

| | Growth | Reduced Energy |
|---|---|---|
| Protein | 28.1 | 24.1 |
| Fat | 18.1 | 8.2 |
| Fiber | 4.2 | 3.3 |
| Ash | 8.6 | 7.5 |
| Moisture | 9.0 | 9.0 |
| 1 | Chicken | Rice |
| 2 | Chicken Meal | Chicken Meal |
| 3 | Oats | Rice Gluten |
| 4 | Rice Grain | Dehulled Barley |
| 5 | Tallow | Tomato Pumace |
| 6 | Rice | Tallow |
| 7 | Dehulled Barley | Animal Digest |
| 8 | Animal Digest | Omega Plus |
| 9 | Tomato Pumace | Grape Pumace |
| 10 | Omega Plus | Salt |
| 11 | Grape Pumace | Vitamin C 35% |
| 12 | Salt | Taurine |
| 13 | Vitamin C 35% | Vitamin E 50% |
| 14 | Taurine | Marigold Meal |
| 15 | Vitamin E 50% | Vitamins & Minerals |
| 16 | Marigold Meal | |
| 17 | Vitamins & Minerals | |

FIG. 2 illustrates a process flow diagram of the manufacturing process and blending system for the customized dry kibble. In a first batching step, various dry ingredients, in their respective storage containers 10, are fed into a single container 12 for mixing. The ingredient mixture is then fed into an extrusion machine 14, which cooks the mixture and extrudes it into the appropriate sized shapes. The individual kibble pieces are then fed through a drying machine 16 and a continuous coating machine 18 in which the kibble pieces can be coated with any type of coating as is known in the art, such as a tallow mixture. To manufacture the customized dry kibble product, pre-made, dry kibble of various formulations and sizes is fed into multiple bulk storage containers 20 for the blending necessary to manufacture the customized dry kibble or pet food.

The blending system includes a storage container for each kind and size of kibble. For example, one storage container 20 can contain a high protein, small sized kibble; a second container 20 can contain a high protein, large sized kibble; a third container can contain a low fat, high fiber, small sized kibble; a fourth container can contain a low fat, high fiber, large sized kibble, etc. A selected volume by weight of dry kibbles, pre-selected from the individual storage containers 20, are fed into a single container 22 for blending. The blended kibble mixture is then fed through a batch coating machine 24 in which the blended kibble mixture is coated with the preselected functional cocktails according to the information from the pet profile. The customized dry kibble product is then packaged and labeled by a packaging/labeling machine 26 and sent to shipping where it is coupled with the proper wet food, functional snacks and treats, and health accessories that balance out the nutritional needs of the animal. The complete, customized dietary health management system is sent to the customer with specific feeding instructions for their animal. The customized dietary health management system, in addition to providing a balanced diet that is specific to the needs to the animal, also includes a feedback mechanism that allows the customized diet to be changed as the needs of the companion animal change.

EXAMPLE 1

An example of a customized dry kibble formulation for a small, young dog is illustrated in the table below:

| CUSTOMIZED FORMULATION FOR TOY DOG PUPPY | |
|---|---|
| INGREDIENTS/Small Kibbles | |
| Chicken | |
| Chicken meal | |
| Rice | |
| Rice Gluten | |
| Oats | |
| Animal Fats | |
| Barley, Dehulled | |
| Digest | |
| Flax Seeds/Fish Oil | |
| Tomato Pumace | |
| Grape Pumace | |
| Salt | |
| Vitamin E Acetaic | |
| Ascorbic Mono phosphate | |
| Marigold Meal | |
| Vitamins | |
| Taurine | |
| PUPPY COCKTAIL | |
| Flax Seed Oil | |
| Sunflower Oil | |
| Chicory | |
| Flax Seeds/Fish Oil | |
| SKIN & COAT COCKTAIL | |
| Sunflower Oil | |
| Flax Seed Oil | |
| Vitamin E Oil | |
| MACRO NUTRIENTS | |
| Protein | |
| Fat | |
| Fiber | |
| Ash | |
| Moisture | |
| Carbohydrates | |
| Kcal/100 grams | 363 |
| Density kg/hl | 45.0 |
| Grams per Cup | 107 |
| Kcal per cup | 388 |
| COCKTAILS | |
| Puppy Cocktail | |
| Skin & Coat Cocktail | |

The subject invention provides a customized diet and customized dietary health management system for companion animals that is selected on the basis of a pet's attributes and nutritional needs. The customized dietary health management system includes a customized dry kibble product and selected wet pet food, functional snacks and treats, and health accessories that together provide for all of the nutritional needs, plus selected nutricueticals to help prevent and treat health issues of the companion animal. The dietary health management system is customized and manufactured for each companion animal and sent directly to the pet owner, veterinarian or animal health care provider on a regular basis. The system also includes a feedback mechanism that allow the dietary health management system to be adjusted as the needs of the companion animal changes.

One skilled in the art will readily appreciate that the present invention is well adapted to carry out the objects and obtain the ends and advantages mentioned, as well as those inherent therein. The inventive customized pet food diet selected on the basis of a pet's attributes and nutritional needs, that includes a customized dry pet food kibble and selected wet pet food, functional snacks and treats and health accessories, packaged with specific feeding instructions for the pet described herein are presently representative of the preferred embodiments, are exemplary, and are not intended as limitations on the scope of the invention. Changes therein and other uses will occur to those skilled in the art which are encompassed within the spirit of the invention and are defined by the scope of the claims.

What is claimed is:

1. A method of producing a customized dry pet food product formulated from a dry pet food kibble recipe and selected functional ingredients, the formulation being selected on the basis of an individual pet's attributes and physical conditions, the method comprising the steps of:
   a. providing a plurality of batches of different formulations of individual pre-made dry kibble pieces:
   b. selecting at least a first formulation of the individual pre-made dry kibble pieces from the plurality of batches;
   c. separating a predetermined volume of the at least first formulation of the individual pre-made dry kibble pieces from the selected batch;
   d. providing a plurality of mixtures of functional ingredients;
   e. coating the volume of dry kibble pieces with a mixture of functional ingredients selected from the plurality of mixtures;
   f. packaging and labeling the predetermined volume of coated individual dry kibble pieces;
      wherein the selection of the at least first formulation of the pre-made dry kibble and the selection of the mixture of functional ingredients is based on an individual pet's attributes and physical conditions in order to provide a customized dry pet food product.

2. The method of claim 1, wherein the mixtures of functional ingredients are selected from a group consisting of green lipped mussel extract, borage oil, sunflower oil, flax seed oil, flax seeds, fish oil, L-carnatine, conjugated linoleic acid, fructooligosaccharide, vitamin E oil, ground chicory, vitamin C, SAMME, Gamma linoenic acid, evening primerose oil, soy isoflavones, creatine, herbs, mannan oligosaccharides, and antioxidants.

3. The method of claim 2, wherein the functional ingredients provide health and disease prevention benefits selected from a group consisting of weight loss, joint health, digestive health, skin and coat health, wound healing, puppy health, senior pet health, immune system enhancement, and life enhancement.

4. The method of claim 1, wherein at least two formulations of individual pre-made dry kibble pieces are selected from the plurality of batches.

5. The method of claim 1, further including the step of adding to the customized dry pet food product a selected wet pet food, functional snacks and treats, and health accessories in order to provide a customized dietary health management system for companion animals.

6. The method of claim 5, wherein the customized dry pet food product and selected wet pet food, functional snacks and treats, and health accessories are packaged with feeding instructions and delivered to a pet owner, veterinarian or animal health care provider on a regular predetermined basis.

7. The method of claim 4, further including the step of blending the at least two selected formulations of the individual pre-made dry kibble pieces in a single container.

8. The method of claim 1, wherein the individual pet's attributes and physical conditions are based on information received from the pet's owner, veterinarian or animal health care provider.

9. The method of claim 8, wherein the information received from the pet's owner or veterinarian is input into a software system for formulation of the customized pet food product and the selection of wet pet food and functional snacks and treats required for a customized dietary health management system.

10. The method of claim 1, wherein the plurality of batches of different formulations of individual pre-made dry kibble pieces is selected from the group of formulations for growth or reduced energy.

\* \* \* \* \*